SAMUEL MATHER.
Improvement in Cotton Tie Stretcher.
No. 118,254. Patented Aug. 22, 1871.
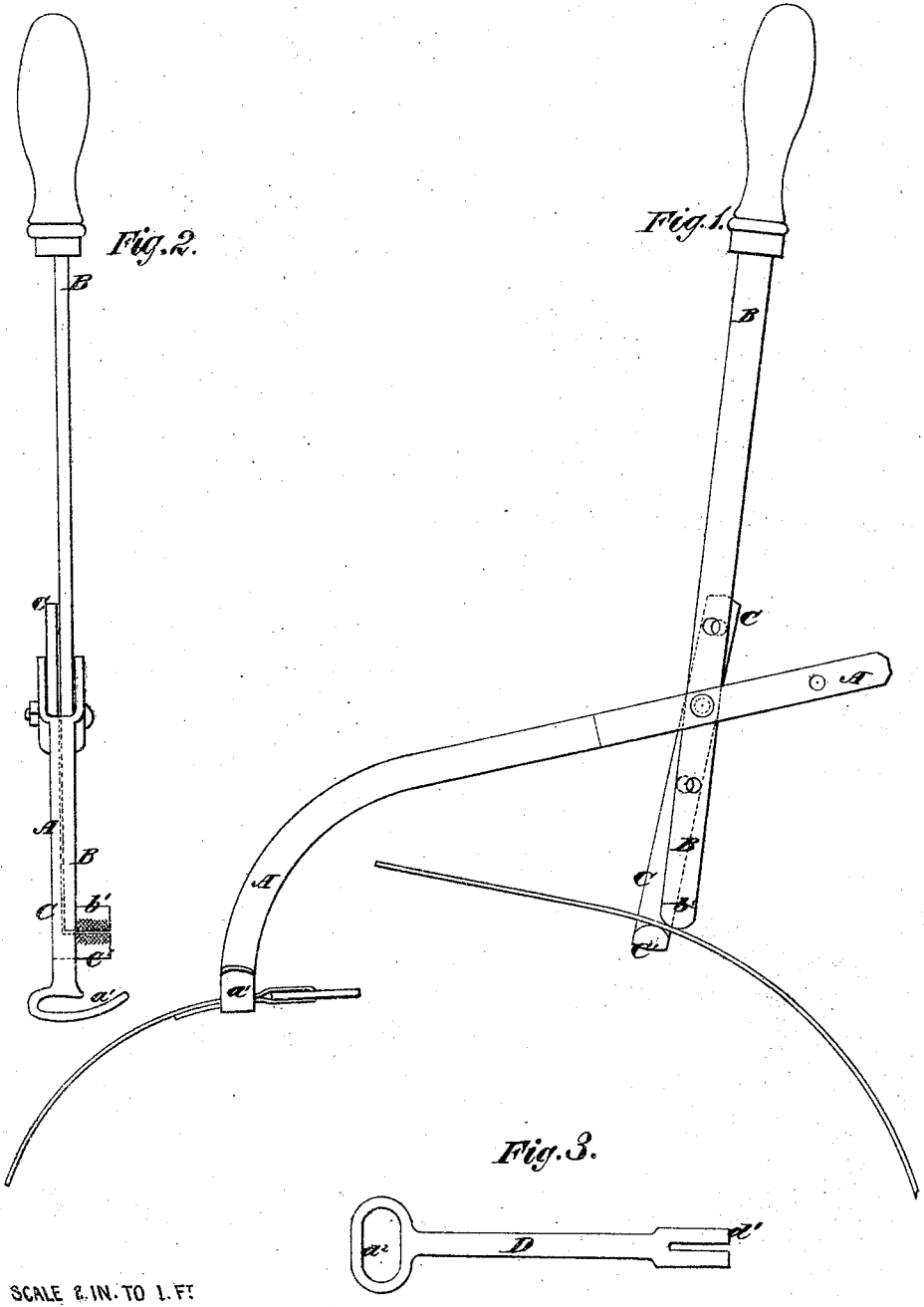

UNITED STATES PATENT OFFICE.

SAMUEL MATHER, OF NEW BRAUNFELS, TEXAS.

IMPROVEMENT IN COTTON-TIE STRETCHERS.

Specification forming part of Letters Patent No. 118,254, dated August 22, 1871.

*To all whom it may concern:*

Be it known that I, SAMUEL MATHER, of New Braunfels, in the county of Comal and State of Texas, have invented a new and useful Improvement in Cotton-Tie Stretchers; and I do hereby declare that the following is a full, clear, and exact description thereof, which will enable others skilled in the art to make and use the same, reference being had to the accompanying drawing forming part of this specification, in which—

Figure 1 is a side view of my improved stretcher, illustrating its use. Fig. 2 is a front view of the same. Fig. 3 represents a tool for looping the band.

Similar letters of reference indicate corresponding parts.

My invention has for its object to furnish a simple, convenient, and effective instrument for drawing the band around the bale so that it may be drawn snug and conveniently fastened; and it consists in the construction and combination of the various parts of the instrument, as hereinafter more fully described.

A is a bar, upon the forward end of which is formed a transverse hook, $a'$, made of such a shape and size as to receive the bale-band. The end of the hook $a'$ is turned upward, as shown in Fig. 2, so that it may be readily passed beneath the end of the band. The bar A is curved, as shown in Fig. 2, and its upper end is slotted, as shown in Fig. 2, to receive the lever B and the arm C, which are pivoted to said slotted bar A by a bolt or pin which passes through the said lever, arm, and slotted bar, several holes being formed in the said lever, arm, and bar to receive the said pin or bolt, so that the instrument may be adjusted as required. Upon the lower end of the lever B is formed a jaw, $b'$, the lower face of which is rounded off and roughened. Upon the lower end of the arm C, which extends down a little lower than the lever B, is formed a similar jaw, $c'$, the upper face of which is rounded off and roughened, as shown in Figs. 1 and 2.

In using the stretcher one end of the band is bent over upon itself to form a loop, which is passed through the loop of the buckle or tie. The hook $a'$ of the bar A is passed around the looped end of the band a little in the rear of the buckle. The other end of the band is then drawn up and passed between the jaws $b\ c$ of the lever B and arm C, and by operating the lever B the two ends of the band will be drawn toward each other, drawing the band closely around the bale. A loop is then formed in the band, in proper position to be passed through the slot of the buckle, by turning the end of the band back upon itself.

The loops in the ends of the band may be formed by bending the band with the fingers or with a tool prepared for that purpose. The instrument may be held in place, holding the band stretched while the last loop is being formed, by resting the free end of the lever B against the thigh of the operator.

D represents a tool for bending the band to form the loops. The tool D consists of a short bar having a slot, $d^1$, formed in one end, of sufficient length and breadth to receive the band, and having a handle, $d^2$, formed upon its other end, as shown in Fig. 3.

Having thus described my invention, I claim as new and desire to secure by Letters Patent—

The improved cotton-tie stretcher herein described, consisting of the bent bar A having hook $a'$ at one end and slot at the other, the lever B having jaw $b'$, in combination with the adjustable arm C with jaw $c'$, all constructed and operating substantially as and for the purpose set forth.

The above specification of my invention signed by me this 10th day of June, 1871.

SAMUEL MATHER.

Witnesses:
JAMES T. GRAHAM,
T. B. MOSHER.